US011875660B2

(12) United States Patent
Tarchi et al.

(10) Patent No.: US 11,875,660 B2
(45) **Date of Patent: *Jan. 16, 2024**

(54) MULTIPLE PROXIMITY SENSORS BASED ELECTRONIC DEVICE

(71) Applicant: HCL Technologies Italy S.p.A., Rome (IT)

(72) Inventors: Sergio Tarchi, Rome (IT); Federico Pezzotti, Rome (IT)

(73) Assignee: HCL TECHNOLOGIES ITALY S.P.A., Vimodrone (IT)

( * ) Notice: Subject to any disclaimer, the term of this patent is extended or adjusted under 35 U.S.C. 154(b) by 50 days.

This patent is subject to a terminal disclaimer.

(21) Appl. No.: 17/580,873

(22) Filed: Jan. 21, 2022

(65) Prior Publication Data

US 2022/0148409 A1 May 12, 2022

Related U.S. Application Data

(63) Continuation of application No. 17/038,631, filed on Sep. 30, 2020, now Pat. No. 11,263,888.

(51) Int. Cl.
*G08B 25/00* (2006.01)
*G08B 21/18* (2006.01)

(52) U.S. Cl.
CPC .................................... *G08B 21/18* (2013.01)

(58) Field of Classification Search
USPC .. 340/686.1, 687, 686.6, 691.6, 825.19, 5.2, 340/5.32, 5.61, 5.91, 825.36, 7.55, 825.49
See application file for complete search history.

(56) References Cited

U.S. PATENT DOCUMENTS

| | | | | |
|---|---|---|---|---|
| 8,140,128 | B2 | 3/2012 | McDowell et al. | |
| 8,483,780 | B2 | 7/2013 | Goris et al. | |
| 8,838,085 | B2 | 9/2014 | Forutanpour et al. | |
| 8,954,099 | B2 * | 2/2015 | Forutanpour | G06F 1/163 345/158 |
| 9,652,044 | B2 | 5/2017 | Koukoumidis et al. | |
| 9,794,748 | B2 | 10/2017 | Rouaissia et al. | |
| 9,903,753 | B2 * | 2/2018 | Alameh | G01J 1/44 |
| 10,392,860 | B2 * | 8/2019 | Barnett | E06B 9/322 |

(Continued)

FOREIGN PATENT DOCUMENTS

| | | | |
|---|---|---|---|
| KR | 20110071966 | A | 6/2011 |
| KR | 20140024174 | A | 2/2014 |

OTHER PUBLICATIONS

Ken Hinckley, "Sensing Techniques for Mobile Interaction".

*Primary Examiner* — Daniel Previl

(57) ABSTRACT

A multiple proximity sensors based electronic device is disclosed. The electronic device includes a plurality of proximity sensors, which are configured to iteratively capture at least one proximity parameter at predefined time intervals. A processor within the electronic device determines a value of the at least one proximity parameter and compares the value with a predefined threshold value. The processor then identifies at least one proximity sensor from the plurality of proximity sensors based on the comparing and determines relative coordinates of each of the at least one proximity sensor with respect to the display. The processor then performs a predefined action within the electronic device based on the relative coordinates determined for each of the at least one proximity sensor.

10 Claims, 8 Drawing Sheets

(56) References Cited

U.S. PATENT DOCUMENTS

| | | | | |
|---|---|---|---|---|
| 10,931,813 | B1 | 2/2021 | Kim | |
| 11,263,888 | B1 * | 3/2022 | Tarchi | G08B 21/18 |
| 2008/0158172 | A1 | 7/2008 | Hotelling et al. | |
| 2015/0237183 | A1 | 8/2015 | Novet | |
| 2015/0378013 | A1 * | 12/2015 | Bikumandla | G01S 7/497 250/208.2 |
| 2017/0257857 | A1 * | 9/2017 | Chaudhuri | H04W 76/14 |
| 2019/0174241 | A1 * | 6/2019 | Janßen | G08B 23/00 |
| 2021/0120101 | A1 | 4/2021 | Alexander et al. | |

* cited by examiner

MULTIPLE PROXIMITY SENSORS BASED ELECTRONIC DEVICE

CROSS-REFERENCE TO RELATED APPLICATIONS

The present application claims priority to and is a continuation application of U.S. patent application Ser. No. 17/038,631 entitled "MULTIPLE PROXIMITY SENSORS BASED ELECTRONIC DEVICE", and filed 30 Sep. 2020 by SERGIO TARCHI, et al. The entirety of the aforementioned application is incorporated herein by reference for all purposes

TECHNICAL FIELD

This disclosure relates generally to portable electronic devices, and more particularly to a multiple proximity sensors based electronic devices.

BACKGROUND

Ever since the advent of smartphones, proximity sensors have been widely used for one or more applications in smartphones. Proximity sensors may also be used in other electronic devices, for example, tablets or laptops. Proximity sensors gather information from surroundings and convert such gathered information into electrical or digital signals, which are then processed by an electronic device to performs preconfigured functionalities. Smartphones are embedded with a single proximity sensor, which is used to determine whether the smartphone's touch screen display is in close proximity to a user's face during an ongoing call or not. Accordingly, the smartphone turns off the touch screen display to optimize battery consumption and to avoid unintended touches on the touch screen display. However, in conventional devices (especially smartphones) the use of proximity sensors is mostly limited to the above mentioned application.

There is therefore, a need for an electronic device that is configured to employ multiple proximity sensors for enabling a variety of end applications.

SUMMARY

In one embodiment, an electronic device is disclosed. The electronic device includes a plurality of proximity sensors placed at a plurality of locations within the electronic device, which are configured to iteratively capture at least one proximity parameter at predefined time intervals. The electronic device further comprises a processor communicatively coupled to each of the plurality of proximity sensors. The electronic device includes a memory communicatively coupled to the processor which stores processor instructions and causes the processor to analyze the at least one proximity parameter captured by each of the plurality of proximity sensors at each of the predefined time intervals. The processor further determines, for each of the plurality of proximity sensors, a rate of change of the associated at least one proximity parameter in response to the analyzing. The processor further computes a stability factor for the electronic device based on the determined rate of change of the associated at least one proximity parameter for each of the plurality of proximity sensors. The processor further compares the stability factor with a stability threshold and determines a fall probability of the electronic device based on comparison of the stability factor with the stability threshold.

In another embodiment, an electronic device that includes a display is provided. The electronic device further includes a plurality of proximity sensors placed at a plurality of locations within the electronic device, which are configured to capture at least one proximity parameter. The electronic device further includes a processor coupled to the display and each of the plurality of proximity sensors. The electronic device further includes a memory communicatively coupled to the processor, which stores processor instructions, and causes the processor to determine a value of the at least one proximity parameter captured by each of the plurality of proximity sensors. The memory further causes processor to compare, for each of the plurality of proximity sensors, the value determined for the associated at least one proximity parameter with a predefined threshold value. The memory further causes processor to identify at least one proximity sensor from the plurality of proximity sensors based on the comparison, and determines relative coordinates of each of the at least one proximity sensor with respect to the display and performs a predefined action within the electronic device based on the relative coordinates determined for each of the at least one proximity sensor.

In yet another embodiment, a method of controlling an electronic device is provided. The method includes receiving at least one proximity parameter from a plurality of proximity sensors placed at a plurality of locations within the electronic device. Each of the plurality of proximity sensors is configured to iteratively capture the at least one proximity parameter at predefined time intervals. The method further includes analyzing the at least one proximity parameter captured by each of the plurality of proximity sensors at each of the predefined time intervals. The method includes determining, for each of the plurality of proximity sensors, a rate of change of the associated at least one proximity parameter in response to the analyzing. The method includes computing a stability factor for the electronic device based on the determined rate of change of the associated at least one proximity parameter for each of the plurality of proximity sensors. The method further include comparing the stability factor with a stability threshold. The method includes determining a fall probability of the electronic device based on comparison of the stability factor with the stability threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1A:
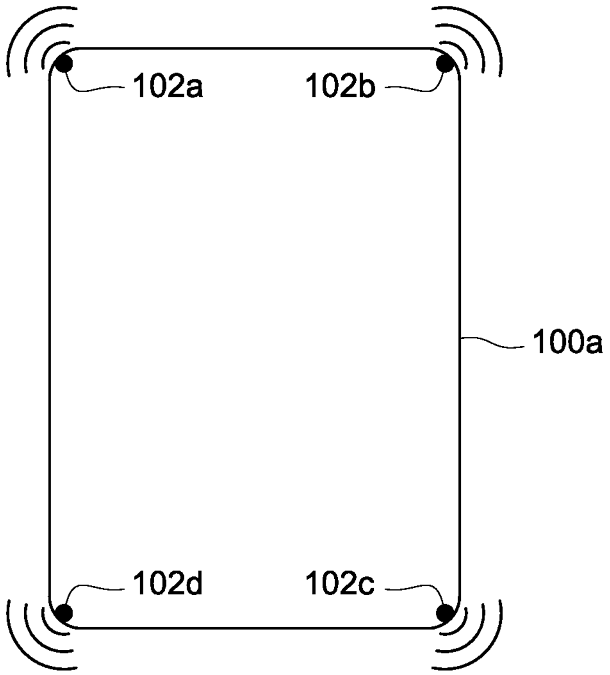
FIGS. 1A and 1B illustrate exemplary electronic devices that include a plurality of proximity sensors, in accordance with some embodiments.
Figure 1B:
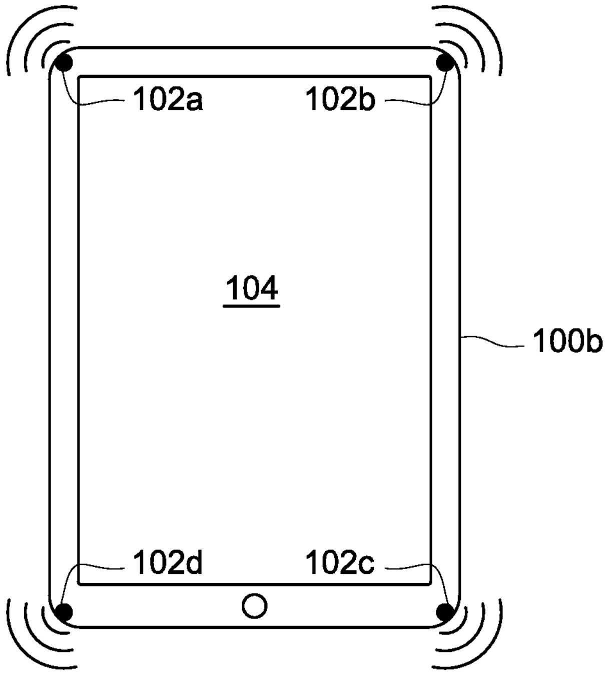

Referring to FIGS. 1A and 1B, electronic device 100*a* and 100*b* that include a plurality of proximity sensors 102 are illustrated, in accordance with some embodiments. The electronic device 100*a* as depicted in FIG. 1A, may be a portable electronic device that does not include a display screen. Examples of the electronic device 100*a* may include, but are not limited to a Wireless Fidelity (Wi-Fi) router, a landline phone, a gaming console, a handled controller, a set-top box, or a storage device (for example, a portable storage drive). However, the electronic device 100*b*, as depicted in FIG. 1B may include a display screen 104. Examples of the electronic device 100*b* may include, but are not limited a smartphone, a handheld videogame, a smart phone, a laptop, a tablet or a phablet.

Each of the electronic devices 100*a* and 100*b* also include the plurality of proximity sensors 102. Each of the plurality of proximity sensors 102 may include one or more of, but are not limited to capacitive sensor, capacitive displacement sensor, doppler effect sensor, inductive sensor, magnetic sensors (including magnetic proximity fuse), optical sensor, photoelectric sensor, laser rangefinder sensors, passive sensor (such as charge-coupled devices), passive thermal infrared sensor, ultrasonic sensor, or fiber optics sensor.

For each of the electronic devices 100*a* and 100*b*, the plurality of proximity sensors 102 may be placed at a plurality of locations within the electronic devices 100*a* and 100*b*. By way of an example, fours proximity sensors may be placed within the electronic devices 100*a* and 100*b*, such that, a proximity sensor 102*a* is placed at a top left corner, a proximity sensor 102*b* is placed at a top right corner, a proximity sensor 102*c* is placed at a bottom right corner, and a proximity sensor 102*d* is placed at a bottom left corner. It will be apparent to a person skilled in the art that other exemplary locations of the plurality of proximity sensors 102 within the electronic devices 100*a* and 100*b* are within the scope of the invention. Examples of other such exemplary locations may include, but are not limited to corners of backside of the electronic devices 100*a* and 100*b*.

Each of the plurality of proximity sensors 102 may be configured to iteratively capture at least one proximity parameter at predefined time intervals. In an embodiment, in the electronic device 100*b*, each of the plurality of proximity sensors 102 may be selectively activated or deactivated to capture at least one proximity parameter. A user may selectively activate or deactivate one or more of the plurality of proximity sensors 102. Additionally, an application may have been installed within the electronic device 100*b* through which a user may disable one or more of the plurality of sensors 104. This selective activation and deactivation of one or more of the plurality of proximity sensors 102 may optimize power consumption of the electronic device 100*b*.

By way of an example, a user, while playing a particular game in the electronic device 100*b*, may switch on or off a particular proximity sensor or sensors, if they are not required while playing the game. In an embodiment, a set of gestures may also be used for selective activation and deactivation of one or more of the plurality of proximity sensors 102. It will be apparent to a person skilled in the art that various other mechanisms to enable or disable the plurality of proximity sensors 102 may be adapted and implemented.

Figure 2:
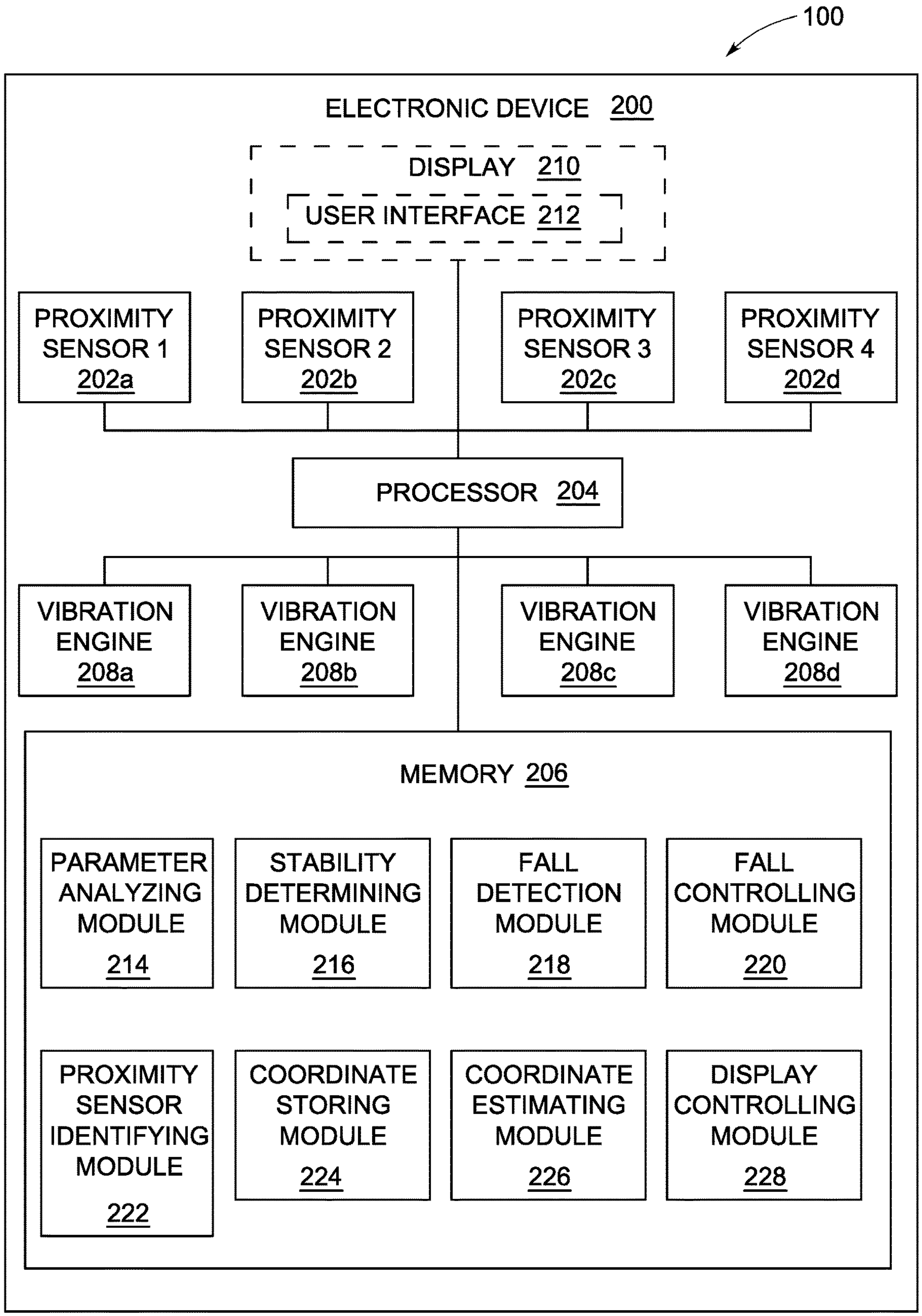
FIG. 2 illustrates a functional block diagram depicting various components within an electronic device that includes a plurality of proximity sensors, in accordance with an embodiment.

Referring now to FIG. 2, a functional block diagram depicting various components within an electronic device 200 that includes a plurality of proximity sensors 202 is illustrated, in accordance with an embodiment. The electronic device 200, for example, may be one of the electronic devices 100*a* or 100*b*. The plurality of proximity sensors 202 (similar to the plurality of proximity sensors 102) may be placed at various locations within the electronic device 200. For example, the plurality of proximity sensors 202 may include proximity sensors 202*a*, 202*b*, 202*c*, and 202*d*, as depicted in FIG. 2. The proximity sensors 202*a*, 202*b*, 202*c*, and 202*d* may, for example, be placed at corners of the electronic device 200 as depicted in FIG. 1 for electronic devices 102*a* and 102*b*. Each of the proximity sensors 202*a*, 202*b*, 202*c*, and 202*d* may be configured to iteratively capture at least one proximity parameter. Further, each of the proximity sensors 202*a*, 202*b*, 202*c*, and 202*d* may also be selectively enabled or disabled as explained in FIG. 1.

The electronic device 200 may further include a processor 204 that is communicatively coupled to the proximity sensors 202*a*, 202*b*, 202*c*, and 202*d* and to a memory 206. The memory 206 may include processor instructions, which when executed by the processor 204 cause the processor 204 to use information captured by one or more of the proximity sensors 202*a*, 202*b*, 202*c*, and 202*d* for managing the electronic device 200. In one embodiment, the electronic device 200 may be managed by preventing the electronic device 200 from falling. This is further explained in detail in conjunction with FIG. 3 to FIG. 9. The memory 206 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random-Access Memory (DRAM), and Static Random-Access memory (SRAM).

The electronic device 200 may also include a plurality of vibration engines 208 (for example, a vibration engine 208*a*, a vibration engine 208*b*, a vibration engine 208*c*, and a vibration engine 208*d*) that are communicatively coupled to the processor 204. The processor 204 may selectively control each of the plurality of vibration engines 208 in order to control overall vibration in the electronic device 200. Each of the plurality of vibration engines 208, for example, may be an Eccentric Rotating Mass (ERM) vibration motor or a linear vibration motor. The electronic device 200 may further include a display 210 that may also be communicatively coupled to the processor 204. The display may further have a User Interface (UI) 212 which may be used by a user to interact with the electronic device 200. In one embodiment, the electronic device 200 may be managed by selectively switching off and on at least a portion of the display 210.

The memory 206 may further include various modules, i.e., a parameter analyzing module 214, a stability determining module 216, a fall detection module 218, a fall controlling module 220, a proximity sensor identifying module 222, a coordinate storing module 224, a coordinate estimating module 226, and a display controlling module 228.

As described before, the plurality of proximity sensors 202 placed at a plurality of locations within the electronic device 200 may iteratively capture at least one proximity parameter at predefined time intervals. In order to prevent the electronic device 200 from falling, the parameter analyzing module 214 may analyze the at least one proximity parameter at each of the predefined time intervals. The predefined time interval, for example, may be 1 second. For each of the plurality of proximity sensors 202, the parameter analyzing module 214 further determines a rate of change of the associated at least one proximity parameter in response to the analyzing. In other words and by way of an example, the parameter analyzing module 214 may determine a rate of change of at least one proximity parameter captured by the proximity sensor 202*a*, between two consecutive predefined timer intervals. The parameter analyzing module 214 may repeat this for each of the proximity sensors 202*b*, 202*c*, and 202*d*. The rate of change determined for each of the plurality of proximity sensors 202 may then be shared with the stability determining module 216. By way of an example, the parameter analyzing module 214 may determine the rate of change for the proximity sensor 202*a* as R1, for the proximity sensor 202*b* as R2, for the proximity sensor 202*c* as R3, and for the proximity sensor 202*d* as R4.

The stability determining module 216 may then compute a stability factor for the electronic device 200 based on the determined rate of change of the associated at least one proximity parameter for each of the plurality of proximity sensors 202. The stability factor may be computed based on a weighted average of the rate of change of the associated at least one proximity parameter for each of the plurality of proximity parameters 202. In an embodiment, higher weights may assigned to at least one proximity sensor from the plurality of proximity sensors 202, such that, the rate of change of the at least one proximity parameter for the at least one proximity sensor is greater than a predefined rate threshold. In continuation of the example given above, R2 and R4 may be above the predefined rate threshold, while R1 and R3 may be below the predefined rate threshold. Thus, both R2 and R4 may be assigned a weight of 0.3, while R1 and R3 may be assigned a weight of 0.2. The stability determining module 216 may thus determine the stability factor as depicted by equation 1 given below:

$$\text{Stability Factor } (S)=[(0.2*R1)+(0.3*R2)+(0.2*R3)+(0.3*R4)]/4 \quad (1)$$

The fall detection module 218 may then compare the stability factor with a stability threshold and may determine a fall probability of the electronic device 200 based on comparison of the stability factor with the stability threshold. In an embodiment, when the stability factor is greater than the stability threshold, the fall detection module 218 may determine the fall probability as high. Alternatively, when the stability factor is less than or equal to the stability threshold, the fall detection module 218 may determine the fall probability as low.

Accordingly, based on the determined fall probability, the fall controlling module 220, via the processor 204, may selectively activate at least one first vibration engine (for example, the vibration engines 208*b* and 208*d*) from the plurality of vibration engines 208. The fall controlling module 220, via the processor 204, may further deactivate at least one second vibration engine (for example, the vibration engines 208*a* and 208*c*) from the plurality of vibration engines 208.

Additionally, the fall controlling module 220 may determine a magnitude of activation of each of the at least one first vibration engine based on the determined fall probability. The magnitude of activation may correspond to spinning of each of the at least one first vibration engine. In a similar manner, the fall controlling module 220 may determine a magnitude of deactivation of each of the at least one second vibration engine based on the determined fall probability. The magnitude of deactivation may correspond to spinning of each of the at least one second vibration engine.

The fall controlling module 220, via the processor, may identify the at least one first vibration engine based on location of the at least one first vibration engine relative to the at least one proximity sensor, for which the rate of change of the associated at least one proximity parameter was greater than the predefined rate threshold. The coordinates of each of the plurality of proximity sensors 202 and each of the plurality of vibration engines 208 may be stored in the coordinate storing module 224. This stored coordinate information may enable the fall controlling module 220 to identify the at least one first vibration engine. By way of an example, the vibration engines 208*b* and 208*d* may be identified based on R2 (determined for the proximity sensors 202*b*) and R4 (determined for the proximity sensors 202*d*) being greater than the predefined rate threshold. The fall controlling module 220, via the processor 204, may further generate an alarm based on the fall probability. This is further explained in detail in conjunction with FIG. 4.

The coordinate storing module 224 may additionally store coordinates of each of the plurality of proximity sensors 202 within the electronic device 200 and with respect to coordinates of the display 210. In order to control operation of the display 210, the parameter analyzing module 214 may determine a value of the at least one proximity parameter captured by each of the plurality of proximity sensors 202. By way of an example, the parameter analyzing module 214 may determine value of proximity parameters captured for the proximity sensor 202*a* as V1, for the proximity sensor 202*b* as V2, for the proximity sensor 202*c* as V3, and for the proximity sensor 202*d* as V4. For each of the plurality of proximity sensors 202, the parameter analyzing module 214 may then compare the value determined for the associated at least one proximity parameter with a predefined threshold value.

Based on the comparing, the proximity sensor identifying module 222 may then identify at least one proximity sensor from the plurality of proximity sensors 202. The at least one proximity sensor may be identified, such that, the value of the at least one proximity parameter for the at least one proximity sensor is greater than the predefined threshold value. In continuation of the example above, V2 and V4 may be greater than the predefined threshold value, thus, the parameter analyzing module 214 may identify the proximity sensors 202*b* and 202*d*.

Thereafter, the coordinate estimating module 226 may determine relative coordinates of each of the at least one proximity sensor with respect to the display 210. In continuation of the example above, the coordinate estimating module 226 may determine relative coordinates for each of the proximity sensors 202*b* and 202*d*. To this end, the coordinate estimating module 226 may first extract coordinates of each of the plurality of proximity sensors 202 and the display 210 from the coordinate storing module 224. Thereafter, the coordinate estimating module 226 may compare the coordinates of each of the plurality of proximity sensors 202 with the coordinates of the display 210. The coordinate estimating module 226 may then derive the relative coordinates of each of the plurality of proximity sensors 202 with respect to the display 210.

Based on the relative coordinates of the at least one proximity sensor, the display controlling module 228 may detect that at least a portion of the electronic device 200 is covered by an external object. For example, based on the relative coordinates determined for the proximity sensors 202*b* and 202*d*, the display controlling module 228 may determine that the proximity sensors 202*b* and 202*d* are covered by a piece of paper. Thus, the display controlling module 228 may conclude that half portion of the electronic device 200, that includes the proximity sensors 202*b* and 202*d*, is covered by the piece of paper. The display controlling module 228, via the processor 204, may then perform a predefined action within the electronic device 200 based on the relative coordinates determined for each of the at least one proximity sensor (for example, relative coordinates determined for the proximity sensors 202*b* and 202*d*).

The predefined action may include switching off at least one portion of the display 210 based on the relative coordinates of the at least one proximity sensor (for example, the proximity sensors 202*b* and 202*d*) and relative coordinates of a remaining plurality of proximity sensors (for example, the proximity sensors 202*a* and 202*c*). In continuation of the example above, the display controlling module 228 may conclude that a first half portion of the electronic device 200 that includes the proximity sensors 202*b* and 202*d* is covered by the piece of paper, while a second half portion that does not include the proximity sensors 202*a* and 202*c* is not covered by the piece of paper. Accordingly, the display controlling module 228, via the processor 204, may switch off a portion of the display that is part of the first half portion. This is further explained in detail in conjunction with FIG. 3.

Figure 3:
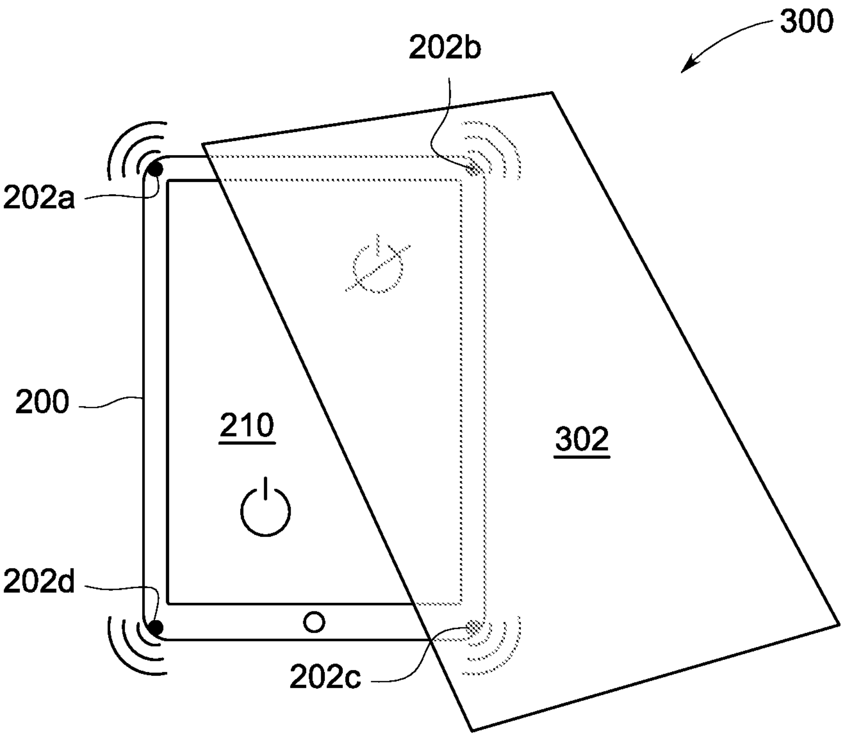
FIG. 3 illustrates an exemplary scenario depicting display optimization in an electronic device that includes a plurality of proximity sensors, in accordance with an exemplary embodiment.

Referring now to FIG. 3, an exemplary scenario 300 depicting display optimization in the electronic device 200 that includes the plurality of proximity sensors 202 is illustrated, in accordance with an exemplary embodiment. The display 210 of the electronic device 200 may be partially covered by an object 302, which is a sheet of paper. Other examples of the object 302 may include, but are not limited to a piece of cloth, a hand, an arm, a book or a box. In FIG. 3, the object 302 may be placed on the electronic device 200, such that, the proximity sensors 202*b* and 202*c* are covered by the object 302. The processor 204 may establish that the proximity sensors 202*b* and 202*c* are covered by the object 302, based on the analysis performed by the parameter analyzing module 214 and the coordinate estimating module 226, as explained above in FIG. 2.

The proximity parameters captured by the proximity sensors 202*b* and 202*c* may indicate that each of the proximity sensors 202*b* and 202*c* are covered. The coordinate estimating module 226 may then determine coordinates of each of the proximity sensors 202*b* and 202*c* relative to the display 210. Accordingly, the coordinate estimating module 226 may estimate a portion of the display 210 that may be covered by the object 302.

By way of an example, an upper left corner of the display 210 may be assigned coordinate value (x, y) of (0, 0). Based on this data along with data related to dimensions of the display 210 and that of the electronic device 200, the coordinate estimating module 226 may determine relative coordinates of the proximity sensors 202*b* and 202*c*. Accordingly, based on the relative coordinates, the coordinate estimating module 226 may estimate a portion of the display 210 that is covered by the object 302. The display controlling module 228 may thus switch off the estimated portion of the display 210. Additionally, after switching off the estimated portion, the display controlling module 228 may shift the content displayed in the estimated portion, to the remaining portion (uncovered portion) of the display 210.

Figure 4:
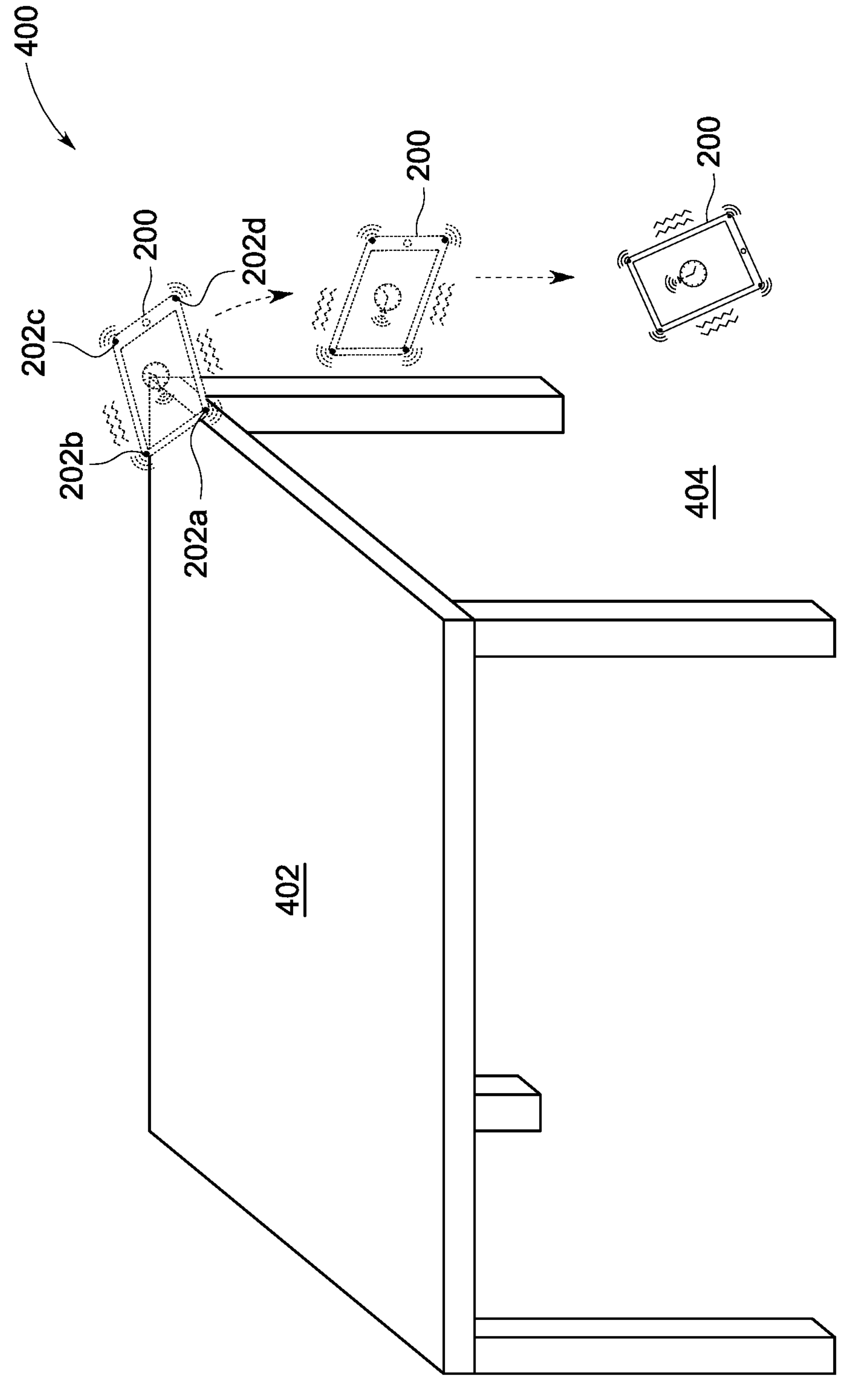
FIG. 4 illustrates an exemplary scenario depicting a safety mechanism deployed by an electronic device that includes a plurality of proximity sensors to avoid a fall, in accordance with an exemplary embodiment.

Referring now to FIG. 4, an exemplary scenario 400 depicting a safety mechanism deployed by the electronic device 200 that includes the plurality of proximity sensors 202 to avoid a fall is illustrated, in accordance with an exemplary embodiment. In the scenario 400, the electronic device 200 may be placed on an edge of a table 402, such that the proximity sensors 202*c* and 202*d* may be facing a floor 404, while the proximity sensors 202*a* and 202*b* may be facing the table 402. Moreover, the electronic device 200 may be precariously placed, such that, the electronic device 200 is slowly inclining towards floor 404 and may ultimately result in the electronic device 200 falling on the floor 404. Moreover, a slight movement within the electronic device 200 or otherwise may actually lead to the electronic device 200 instantly falling on the floor 404.

The information regarding such placement of the electronic device 200 on the table 402 may be captured based on the system description given in FIG. 2. Each of the proximity sensors 202*a*, 202*b*, 202*c*, and 202*d* may iteratively capture at least one proximity parameters at predefined time intervals (for example, 0.5 second). Based on these proximity parameters iteratively captured, the parameter analyzing module 214 may determine that the rate of change for the proximity sensors 202*c* and 202*d* is above the predefined rate threshold. Moreover, the rate of change for the proximity sensors 202*c* and 202*d* is much higher than that of the proximity sensors 202*a* and 202*b*. The stability determining module 216 may then determine a stability factor for the electronic device 200 and may compare that with a stability threshold. Based on the comparison, the fall detection module 218 may determine that the fall probability of the electronic device 200 is very high.

In order to avoid the fall, the fall controlling module 220 may selectively deactivate vibration engines that are closer to the proximity sensors 202*c* and 202*d* (which are leaning toward the floor 404). Additionally, the fall controlling module 220 may selectively activate vibration engines that are closer to the proximity sensors 202*a* and 202*b* (which are leaning away from the table 402). Based on how high the fall probability is, the fall controlling module 220 may accordingly control magnitude of activation and deactivation of respective vibration engines. Additionally, the fall controlling module 220 may also generate an alarm.

In other embodiments, the electronic device 200 the safety mechanism, for example, may include airbags, that are deployed across periphery of the electronic device 200 and are deployed when the determined fall probability is very high.

Figure 5:
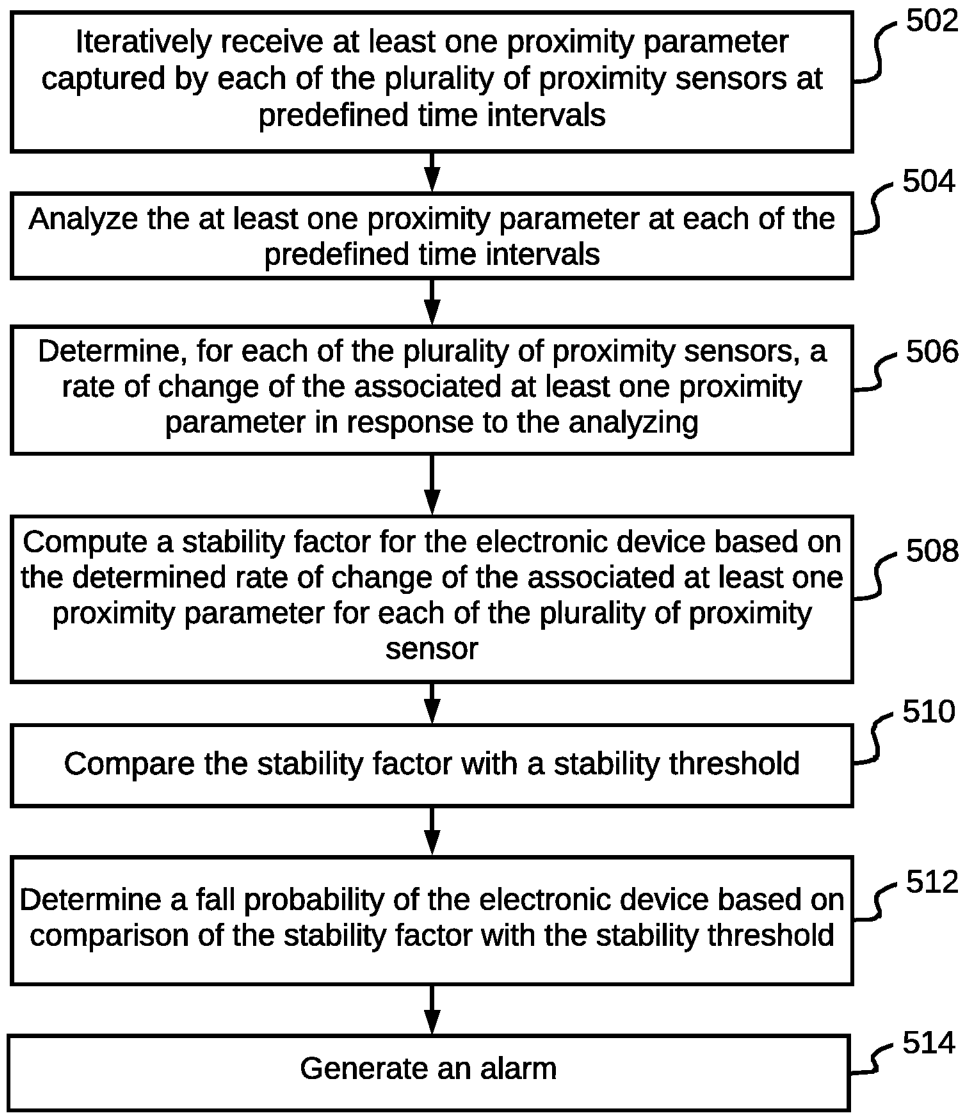
FIG. 5 illustrates a flowchart of a method for controlling an electronic device that includes a plurality of proximity sensors from falling, in accordance with an embodiment.

Referring now to FIG. 5, a flowchart of a method for controlling the electronic device 200 that includes the plurality of proximity sensors 202 from falling is illustrated, in accordance with an embodiment. At step 502, at least one proximity parameter that is iteratively captured at predefined time intervals, is received. The at least one proximity parameter is captured by the plurality of proximity sensors 202 placed at a plurality of locations within the electronic device 200. At step 504, the at least one proximity parameter captured by each of the plurality of proximity sensors 202 at each of the predefined time intervals is analyzed. Thereafter, in response to the analyzing, for each of the plurality of proximity sensors 202, at step 506, a rate of change of the associated at least one proximity parameter is determined. This has already been explained in detail in conjunction with FIG. 2 to FIG. 4.

At step 508, a stability factor is computed for the electronic device 200 based on the determined rate of change of the associated at least one proximity parameter for each of the plurality of proximity sensors 202. The stability factor may be computed based on a weighted average of the rate of change of the associated at least one proximity parameter for each of the plurality of proximity sensors 202. Additionally, higher weights are assigned to at least one proximity sensor from the plurality of proximity sensors 202. The rate of change of the at least one proximity parameter for the at least one proximity sensor is greater than a predefined rate threshold. This has already been explained in detail in conjunction with FIG. 2.

At step 510, the stability factor is compared with a stability threshold. Based on comparison of the stability factor with the stability threshold, at step 512, a fall probability of the electronic device 200 is determined. At step 514, an alarm may be generated based on the fall probability. By way of an example, an alarm may be generated when the fall probability is high. This has already been explained in detail in conjunction with FIG. 2 and FIG. 4.

Figure 6:
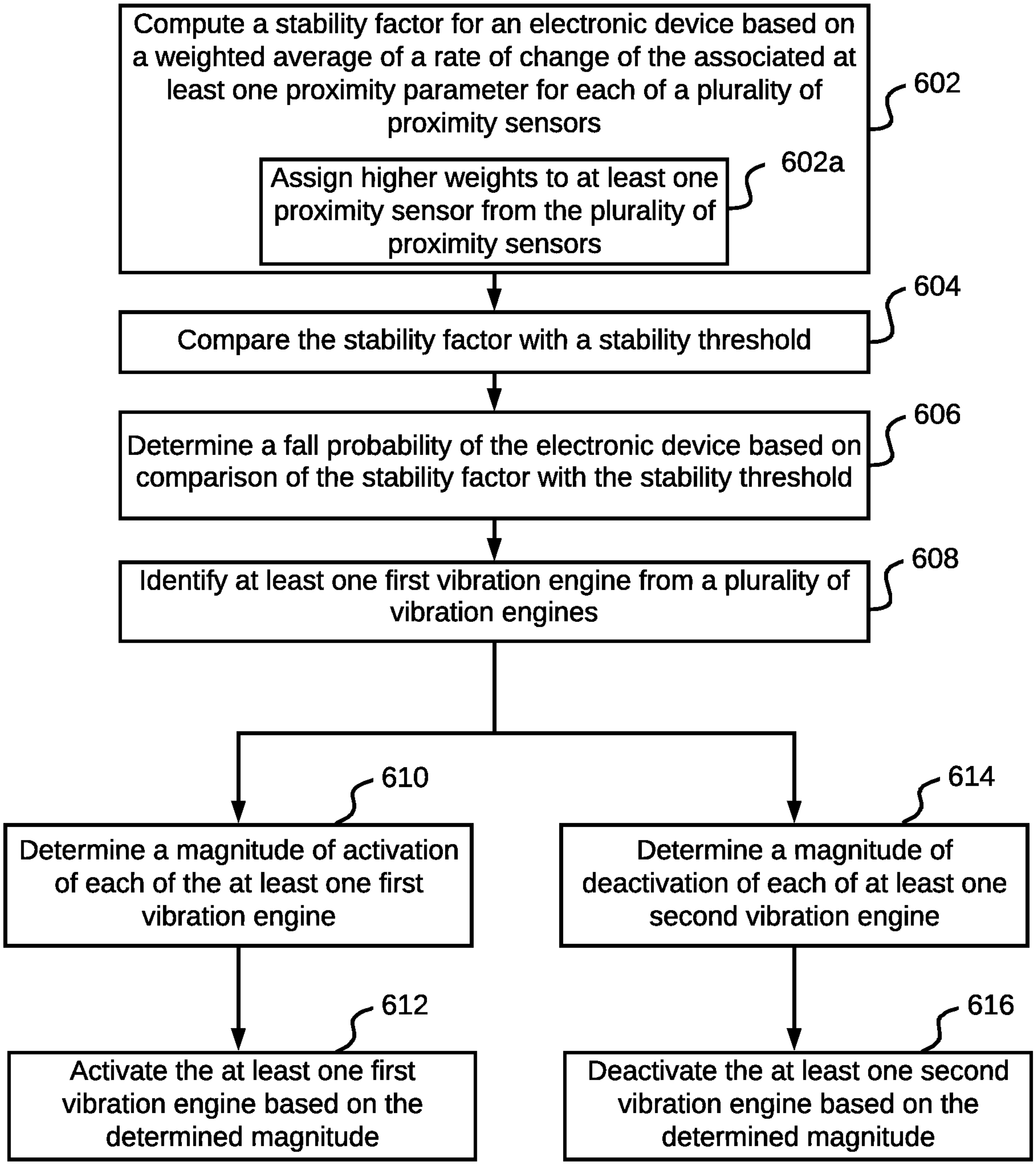
FIG. 6 illustrates a flowchart of a method for activating or deactivating vibration sensors within an electronic device to prevent the electronic device from falling, in accordance with an embodiment.

Referring now to FIG. 6, a flowchart of a method for activating or deactivating one or more of the plurality of vibration engines 208 within the electronic device 200 to prevent the electronic device 200 from falling is illustrated, in accordance with an embodiment. At step 602, a stability factor is computed for the electronic device 200 based on a weighted average of a rate of change of the associated at least one proximity parameter for each of the plurality of proximity sensors 202. The step 602 may further include a step 602*a*, in which higher weights are assigned to at least one proximity sensor from the plurality of proximity sensors 202. The higher weights are assigned to at least one proximity sensor as the rate of change of the at least one proximity parameter for the at least one proximity sensor is greater than a predefined rate threshold.

At step 604, the stability factor is compared with a stability threshold. At step 606, a fall probability is determined for the electronic device 200 based on comparison of the stability factor with the stability threshold. Based on the fall probability, at least one first vibration engine may be identified, at step 608, from the plurality of vibration engines 208. The at least one first vibration engine may be identified based on location of the at least one first vibration engine relative to location of the at least one proximity sensor (for which the rate of change of the at least one proximity parameter was greater than a predefined rate threshold).

Thereafter, at step 610, a magnitude of activation of each of the at least one first vibration engine is determined based on the determined fall probability. The magnitude of activation corresponds to spinning of each of the at least one first vibration engine. At step 612, the at least one first vibration engine is activated based on the determined magnitude. Similarly, at step 614, a magnitude of deactivation of each of at least one second vibration engine from the plurality of vibration engines 208 is determined, based on the determined fall probability. The magnitude of deactivation corresponds to spinning of each of the at least one second vibration engine. At step 616, at least one second vibration engine is deactivated based on the determined magnitude. It will be apparent to a person skilled in the art that the step 610 and the step 614 may be performed concurrently.

Figure 7:
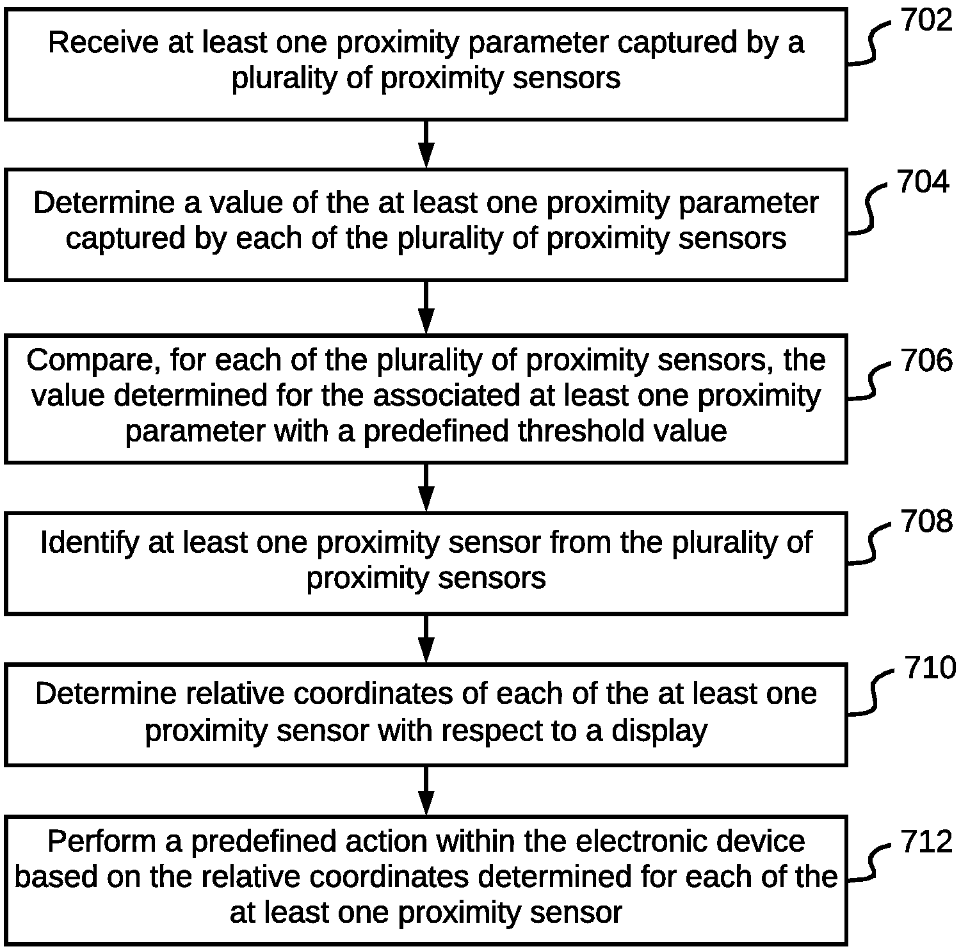
FIG. 7 is a flowchart of a method for optimizing display of an electronic device that includes a plurality of proximity sensors, in accordance with an embodiment.

Referring now to FIG. 7, a flowchart of a method for optimizing the display 210 of the electronic device 200 that includes the plurality of proximity sensors 202 is illustrated, in accordance with an embodiment. At step 702, at least one proximity parameter captured by the plurality of proximity sensors 202 is received. At step 704, a value of the at least one proximity parameter captured by each of the plurality of proximity sensors 202 is determined. For each of the plurality of proximity sensors 202, at step 706, the value determined for the associated at least one proximity parameter is compared with a predefined threshold value. At step 708, at least one proximity sensor is identified from the plurality of proximity sensors 202, based on the comparing. The value of the at least one proximity parameter for the at least one proximity sensor is greater than the predefined threshold value. At step 710, relative coordinates of each of the at least one proximity sensor is determined with respect to the display 210. At step 712, a predefined action is performed within the electronic device based on the relative coordinates determined for each of the at least one proximity sensor. In an embodiment, performing the predefined action includes detecting at least a portion of the electronic device 200 being covered by an external object, based on the relative coordinates of the at least one proximity sensor.

The value of the at least one proximity parameter for the at least one proximity sensor being greater than the predefined threshold value, may indicate that the at least one proximity sensor is covered and a remaining plurality of proximity sensors are uncovered. Thus, the predefined action may include switching off at least one portion of the display 210, based on the relative coordinates of the at least one proximity sensor and relative coordinates of the remaining plurality of proximity sensors.

Figure 8:
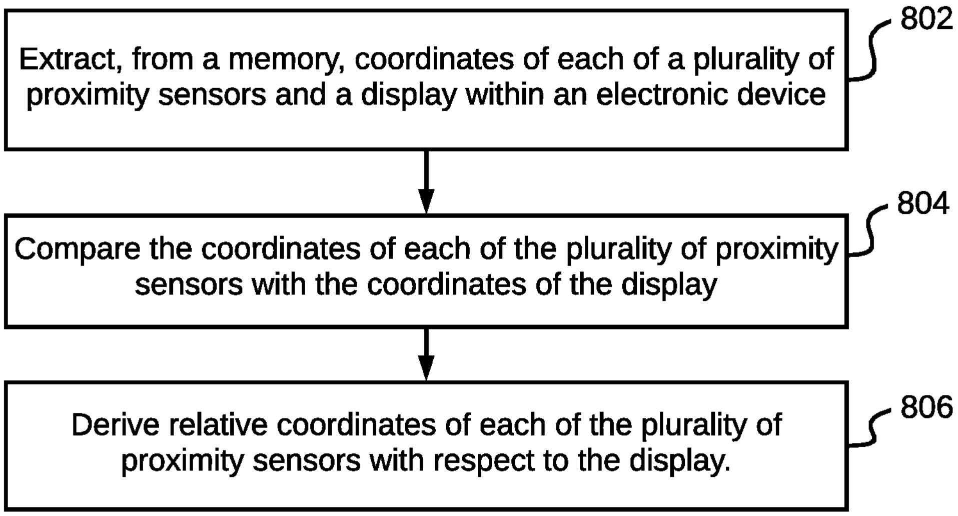
FIG. 8 is a flowchart of a method for determining relative coordinates of each of at least one proximity sensor in an electronic device with respect to a display of electronic device, in accordance with an embodiment.

Referring now to FIG. 8, a flowchart of a method for determining relative coordinates of each of at least one proximity sensor in the electronic device 200 with respect to the display 210 is illustrated, in accordance with an embodiment. At step 802, coordinates of each of the plurality of proximity sensors 202 and the display 210 are extracted from the memory 206 within the electronic device 200. At step 804, the coordinates of each of the plurality of proximity sensors 202 are compared with the coordinates of the display 210. At step 806, the relative coordinates of each of the plurality of proximity sensors 202 with respect to the display 210 are derived. This has already been explained in detail in conjunction with FIG. 2 and FIG. 3.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide a multiple proximity sensors based electronic device. The multiple proximity sensors enable capturing of a plurality of proximity parameters. The plurality of proximity parameters are then analyzed to determine fall probability of the electronic device. Accordingly, vibration engines within the electronic device are selectively activated or deactivated to prevent the electronic device from falling. Additionally, the plurality of proximity parameters may be analyzed to determine whether a specific portion of the display of the electronic device is covered by an external object. Accordingly, the covered portion of the display is switched off and the content displayed on the covered portion is shifted to the uncovered portion of the display. Thus, the battery consumption of the electronic device is optimized by partially switching off the display and the hidden portion of the content is also revealed.

The specification has described a multiple proximity sensors based electronic device. The illustrated steps are set out to explain the exemplary embodiments shown, and it should be anticipated that ongoing technological development would change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. An electronic device comprising:

a display;

a plurality of proximity sensors placed at a plurality of locations within the electronic device, wherein each of the plurality of proximity sensors is configured to capture at least one proximity parameter; and a processor coupled to the display and each of the plurality of proximity sensors;

a memory communicatively coupled to the processor, wherein the memory stores processor instructions, which when executed by the processor, causes the processor to:

determine a value of the at least one proximity parameter captured by each of the plurality of proximity sensors;

compare, for each of the plurality of proximity sensors, the value determined for the associated at least one proximity parameter with a predefined threshold value;

identify at least one proximity sensor from the plurality of proximity sensors based on the comparing, wherein the value of the at least one proximity parameter for the at least one proximity sensor is greater than the predefined threshold value;

determine relative coordinates of each of the at least one proximity sensor with respect to the display; and performing a predefined action within the electronic device based on the relative coordinates determined for each of the at least one proximity sensor.

2. The electronic device of claim 1, wherein the memory is configured to store coordinates of each of the plurality of proximity sensors within the electronic device.

3. The electronic device of claim 2, wherein to determine the relative coordinates of each of the at least one proximity sensor, the processor instructions further cause the processor to:

extract, from the memory, coordinates of each of the plurality of proximity sensors and the display within the electronic device;

compare the coordinates of each of the plurality of proximity sensors with the coordinates of the display; and derive the relative coordinates of each of the plurality of proximity sensors with respect to the display.

4. The electronic device of claim 3, wherein the predefined action comprises switching off at least one portion of the display based on the relative coordinates of the at least one proximity sensor and relative coordinates of a remaining plurality of proximity sensors, wherein the value of the at least one proximity parameter for the at least one proximity sensor being greater than the predefined threshold value indicates that the at least one proximity sensor is covered and the remaining plurality of proximity sensors are uncovered.

5. The electronic device of claim 1, wherein performing the predefined action comprises detecting at least a portion of the electronic device being covered by an external object, based on the relative coordinates of the at least one proximity sensor.

6. A method of controlling an electronic device, the method comprising:

determining a value of the at least one proximity parameter captured by each of a plurality of proximity sensors placed at a plurality of locations within the electronic device, wherein each of the plurality of proximity sensors is configured to capture at least one proximity parameter;

comparing, for each of the plurality of proximity sensors, the value determined for the associated at least one proximity parameter with a predefined threshold value;

identifying at least one proximity sensor from the plurality of proximity sensors based on the comparing, wherein the value of the at least one proximity parameter for the at least one proximity sensor is greater than the predefined threshold value;

determining relative coordinates of each of the at least one proximity sensor with respect to a display; and performing a predefined action within the electronic device based on the relative coordinates determined for each of the at least one proximity sensor.

7. The method of claim 6, storing coordinates of each of the plurality of proximity sensors within a memory of the electronic device.

8. The method of claim of claim 7, determining the relative coordinates of each of the at least one proximity sensor comprises:

extracting, from the memory, coordinates of each of the plurality of proximity sensors and the display within the electronic device;

comparing the coordinates of each of the plurality of proximity sensors with the coordinates of the display; and deriving the relative coordinates of each of the plurality of proximity sensors with respect to the display.

9. The method of claim 8, wherein the predefined action comprises switching off at least one portion of the display based on the relative coordinates of the at least one proximity sensor and relative coordinates of a remaining plurality of proximity sensors, wherein the value of the at least one proximity parameter for the at least one proximity sensor being greater than the predefined threshold value indicates that the at least one proximity sensor is covered and the remaining plurality of proximity sensors are uncovered.

10. The method of claim 6, wherein performing the predefined action comprises detecting at least a portion of the electronic device being covered by an external object, based on the relative coordinates of the at least one proximity sensor.

* * * * *